(12) United States Patent
Beutel et al.

(10) Patent No.: US 9,991,031 B2
(45) Date of Patent: Jun. 5, 2018

(54) INSULATING SYSTEM AND ASSEMBLY METHOD FOR AN INSULATING SYSTEM

(71) Applicant: SIEMENS AKTIENGESELLSCHAFT, Munich (DE)

(72) Inventors: Stefan Beutel, Berlin (DE); Andreas Kleinschmidt, Oranienburg (DE); Dajana Mielke, Oranienburg (DE); Andreas Wetterney, Brixen (DE)

(73) Assignee: Siemens Aktiengesellschaft, Muen (DE)

( * ) Notice: Subject to any disclaimer, the term of this patent is extended or adjusted under 35 U.S.C. 154(b) by 0 days. days.

(21) Appl. No.: 14/898,193

(22) PCT Filed: Jun. 3, 2014

(86) PCT No.: PCT/EP2014/061421
§ 371 (c)(1),
(2) Date: Dec. 14, 2015

(87) PCT Pub. No.: WO2014/198581
PCT Pub. Date: Dec. 18, 2014

(65) Prior Publication Data
US 2016/0133359 A1    May 12, 2016

(30) Foreign Application Priority Data
Jun. 14, 2013    (DE) .................. 10 2013 211 133

(51) Int. Cl.
*H01B 17/30* (2006.01)
*H01B 19/00* (2006.01)
(Continued)

(52) U.S. Cl.
CPC .............. *H01B 17/30* (2013.01); *H01B 19/00* (2013.01); *H02G 5/068* (2013.01); *H02B 13/005* (2013.01); *H02B 13/0358* (2013.01)

(58) Field of Classification Search
CPC ............................... H02G 5/068; H01B 17/30
See application file for complete search history.

(56) References Cited

U.S. PATENT DOCUMENTS 3,331,911 A * 7/1967 Whitehead .......... H01B 9/0672
174/11 R
4,011,396 A * 3/1977 Van Deventer ...... H01B 9/0638
174/11 R
(Continued)

FOREIGN PATENT DOCUMENTS

CN    1124064    6/1996
DE    1111690 B    7/1961
(Continued)

*Primary Examiner* — William H Mayo, III
*Assistant Examiner* — Hiram E Gonzalez
(74) *Attorney, Agent, or Firm* — Laurence Greenberg; Werner Stemer; Ralph Locher

(57) ABSTRACT

An insulating system includes an electrically insulating, substantially disk-shaped insulating configuration which spans a base surface. The insulation configuration includes at least one first and one second sub-element. A joining gap is disposed between the two sub-elements. An assembly method for an insulating system is also provided.

13 Claims, 4 Drawing Sheets

(51) Int. Cl.
*H02G 5/06* (2006.01)
*H02B 13/035* (2006.01)
*H02B 13/00* (2006.01)

(56) References Cited

U.S. PATENT DOCUMENTS

| | | | | |
|---|---|---|---|---|
| 4,591,655 | A | * | 5/1986 | Czech .................... H02G 5/068 |
| | | | | 174/21 C |
| 5,399,095 | A | | 3/1995 | West et al. |
| 5,416,266 | A | | 5/1995 | Mueller |
| 6,118,068 | A | * | 9/2000 | Kelch ...................... H01R 4/60 |
| | | | | 174/28 |
| 2007/0151952 | A1 | | 7/2007 | Bauch et al. |

FOREIGN PATENT DOCUMENTS

| | | |
|---|---|---|
| DE | 102004056160 A1 | 5/2006 |
| DE | 102007046406 A1 | 11/2008 |
| EP | 0181955 A2 | 5/1986 |
| EP | 0593344 A1 | 4/1994 |
| EP | 0597147 A1 | 5/1994 |
| JP | 2004104897 A | 4/2004 |
| WO | 2005074085 A3 | 10/2005 |

\* cited by examiner

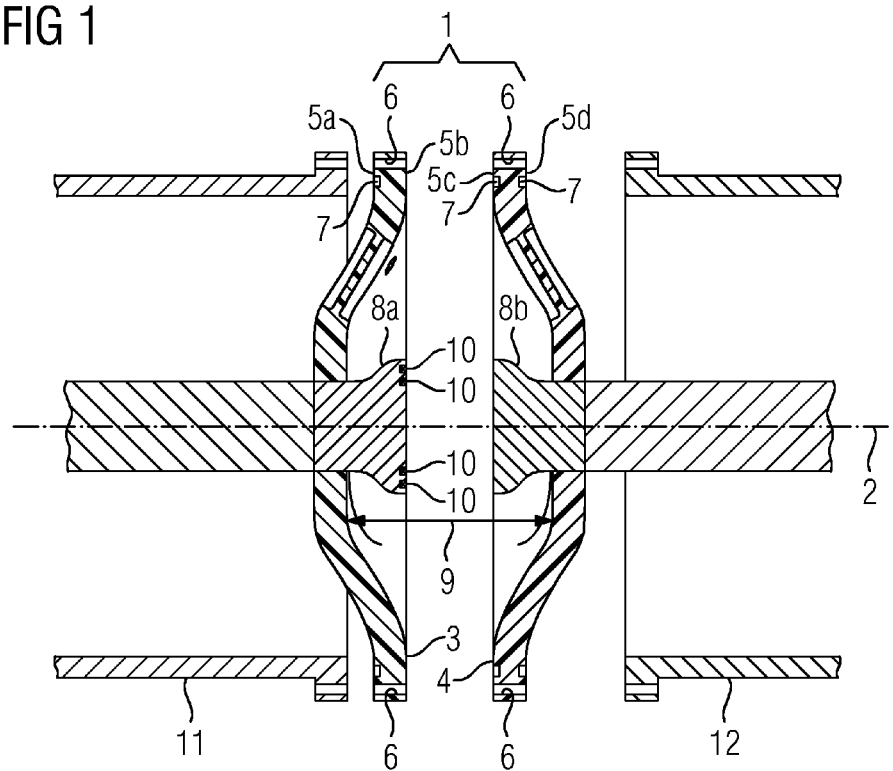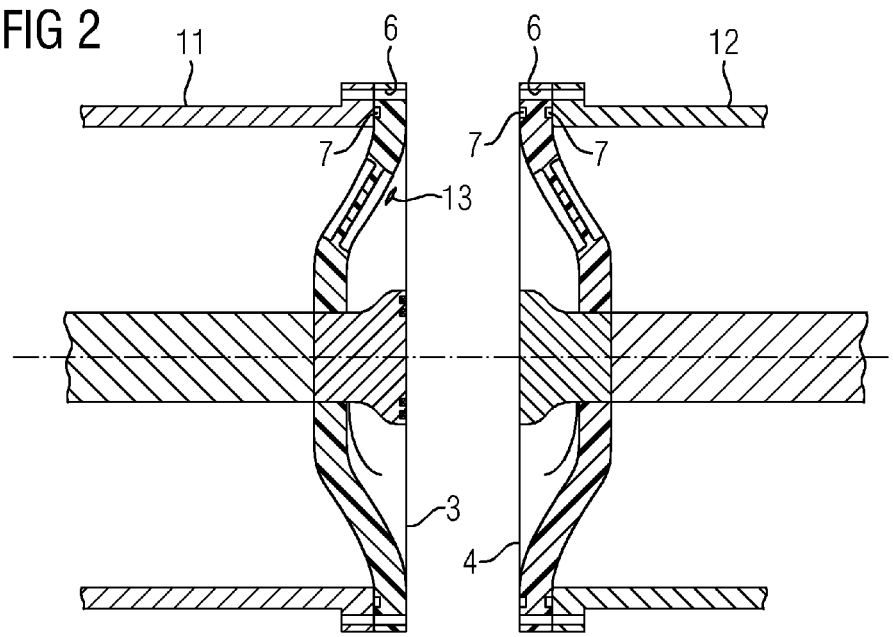

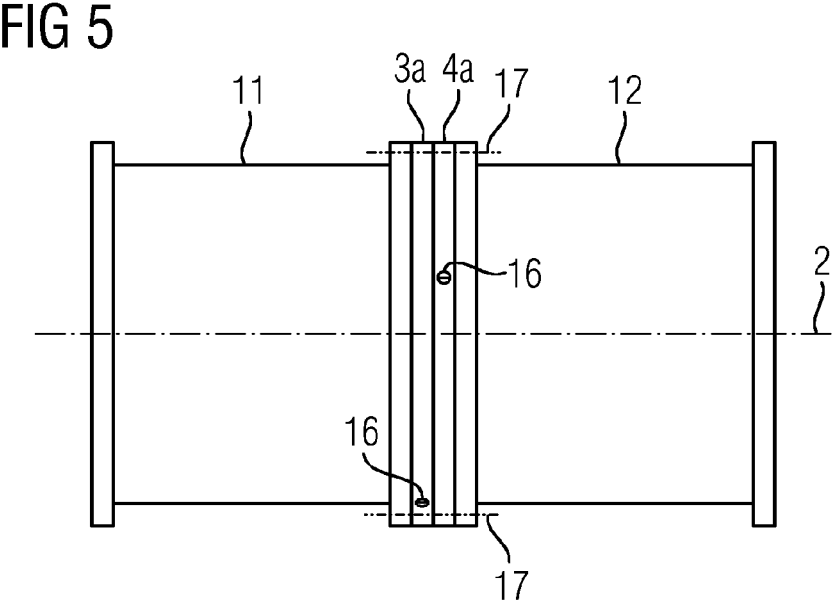
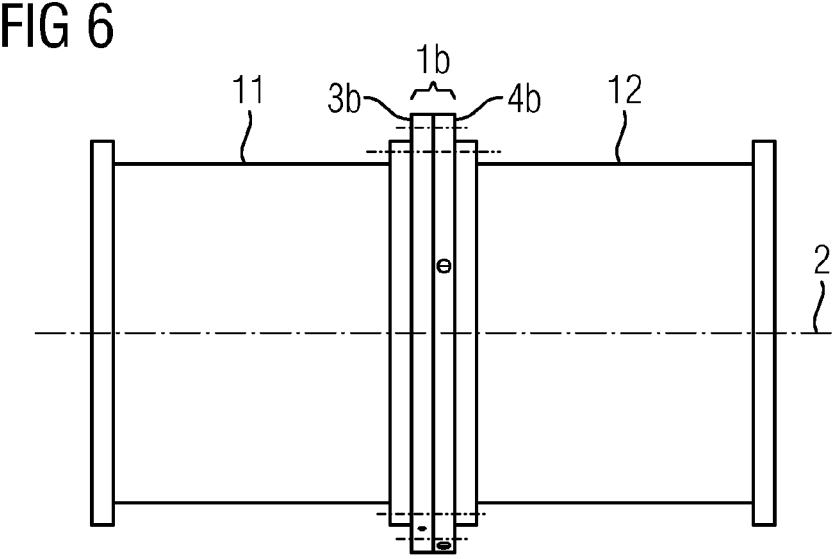

INSULATING SYSTEM AND ASSEMBLY METHOD FOR AN INSULATING SYSTEM

BACKGROUND OF THE INVENTION

Field of the Invention

The invention relates to an insulating system comprising an electrically insulating, substantially disk-shaped insulating arrangement, which spans a base area. The invention also relates to an assembly method for an insulating system which has a substantially disk-shaped, electrically insulating insulating arrangement spanning a plane.

The laid-open patent application DE 10 2004 056 160 A1 discloses an insulating system that has an electrically insulating insulating arrangement. The electrically insulating insulating arrangement is formed as substantially disk-shaped, the insulating arrangement spanning a base area. The insulating arrangement concerned there is at the same time formed substantially in one piece, so that the number of sealing areas and joining gaps within the insulating arrangement is reduced. This on the one hand produces an angularly rigid insulating system that reliably serves for electrical insulation purposes. On the other hand, the variability of such an insulating system must be rated as limited. Furthermore, assembling the known insulating system and using it for example in a gas-insulated switchgear proves to be laborious.

BRIEF SUMMARY OF THE INVENTION

This gives rise to the object of the invention of providing an insulating system that can be used variably with advantageous insulating properties and makes easier assembly possible.

This object is achieved according to the invention in the case of an insulating system of the type mentioned at the beginning by the insulating arrangement having at least one first sub-element and one second sub-element.

An insulating system serves for holding an element in an electrically insulated manner or keeping elements that can have different electrical potentials apart. Thus, the insulating system may serve for example for positioning in an electrically insulated manner a phase conductor, which for example carries high voltage potential, with respect to a carrying element, which for example carries ground potential and on which the phase conductor is for example supported. A disk-shaped insulating arrangement may preferably be passed through by at least one phase conductor. Passing through should take place across the base area. The phase conductor may be embedded in a fluid-type manner in the insulating arrangement or in at least one of the sub-elements. In particular when using a disk-shaped insulating arrangement, the insulating system is suitable for providing for example a sealing barrier over an opening (base area) in the manner of a membrane, so that the opening is substantially closed by the insulating system. In particular, fluids for example can be prevented from entering or leaving through the opening. For example, a plane may extend in the opening. The opening may for example lie on a pipe or pipe connector. At the same time, the disk-shaped insulating arrangement may not only span an opening at the end face of the pipe/pipe connector but also bring about the effect of a sealing barrier within the pipe clearance. A base area may run in a planar manner or for example run in a curved manner. At the same time, the insulating system may represent a fluid-tight barrier. In particular, the disk-shaped insulating arrangement should be formed as fluid-tight. The insulating system should preferably close a clearance/opening in a fluid-tight manner. It should preferably be provided at the same time that the insulating arrangement has a first sub-element and a second sub-element. In addition, the insulating arrangement may also have still further sub-elements. Preferably, both the first sub-element and the second sub-element should have electrically insulating properties, so that each sub-element also itself ensures a potential separation, for example of a phase conductor with respect to a supporting device/a carrying element that has for example an opening intended to be closed by the insulating system. A joining gap should preferably be formed between the two sub-elements, so that each of the two sub-elements itself spans a base area in a disk-shaped manner independently of the other sub-element, respectively. There is consequently the possibility that each sub-element serves for closing an opening independently of the other sub-element, respectively. By joining together the insulating arrangement comprising a first sub-element and a second sub-element, there is the possibility of modifying the shaping of the insulating arrangement. Thus, for example, it may be provided that the two sub-elements are identically formed and support one another in their mechanical stabilization. It may however also be provided that the two sub-elements are designed differently from one another. Consequently, for example, it is possible for the insulating arrangement to be put together in a modular manner. For example, sub-elements with particular surface structures, for example a ribbing or a special surface finish, may thus be combined according to requirements. There is for example the possibility of using the insulating arrangement in such a way that the first sub-element is for example exposed to a first medium and the second sub-element is exposed to a second medium. In this case, the first medium and the second medium may also be identical. It may however also be provided that the media differ from one another. Consequently, the media may for example have different degrees of aggressiveness. Thus there is the possibility of each of the sub-elements being designed specifically for the medium acting on them. Thus, for example, aggressive decomposition products may act on one sub-element, whereas for example a particular surface finish may be necessary on the other sub-element in order to prevent adhesive attachment of the medium present there.

Furthermore, the use of sub-elements on the insulating arrangement provides the possibility of firstly assembling each of the sub-elements itself and, in a later step, joining these sub-elements that are already in a partly assembled state together to form an insulating system. This allows assembly to be made easier, since for example auxiliary constructions are not necessary during assembly and each of the sub-elements can be directly preassembled or assigned to different subassemblies. The insulating arrangement of the insulating system may represent a fluid-tight barrier. In this case, the sub-elements may be component parts of different fluid-tight barriers. It is consequently possible for example to close a receiving space for a fluid and pre-fill it with a fluid. Consequently, various pre-filled modules may be put together to complete the insulating arrangement. In the case of servicing, it may be provided that a disassembly of the insulating arrangement is performed. The fluid-tight barrier can be maintained at at least one of the receiving spaces. The sub-elements may in this case be for example identically formed. In the case of asymmetrical shaping, the sub-elements may preferably be aligned oppositely in relation to one another, so that, when they are interacting in the insulating system, the first sub-element and the second sub-element are oppositely positioned.

The insulating arrangement may in this case be passed through by a phase conductor which carries an electrical current or to which an increased voltage is applied. In this case, each sub-element itself may be respectively passed through by the phase conductor. In particular, each of the sub-elements may completely enclose the phase conductor. The phase conductor may be subdivided into different portions. The phase conductor may be embedded in a fluid-tight manner in each of the sub-elements. It may also be provided that a number of phase conductors pass through one and the same sub-element or insulating arrangement. A sub-element or the insulating arrangement may represent a fluid-tight barrier.

A further advantageous design may provide that a joining gap, which spans the base area, is arranged between the first sub-element and the second sub-element.

The connection of the two sub-elements may lead to the creation of a joining gap between the two sub-elements. By analogy with the insulating arrangement, the joining gap should span a base area. In this case, the joining gap may substantially extend in the plane that is spanned by the insulating arrangement or be displaced parallel to this plane. There is consequently the possibility for example that the insulating arrangement in the interaction of the first sub-element and the second sub-element or each sub-element itself spans a base area in the manner of a membrane. It is thus possible for example to allow an opening to be spanned by one or both sub-elements. There is consequently the possibility for example of closing a flange opening in an encapsulating housing, in particular in a fluid-tight manner, by means of the insulating system. A fluid-tight closure provides the possibility of filling a receiving space of the encapsulating housing with an electrically insulating fluid, which is hermetically closed off from the surroundings by the encapsulating housing. Gaseous or liquid sulfur hexafluoride, nitrogen, carbon dioxide or other fluids, such as insulating oils or insulating esters, are suitable for example as fluids. In particular, these electrically insulating fluids may be arranged under excess pressure inside the encapsulating housing, so that the electrical insulation resistance thereof is additionally increased. There is consequently the possibility of arranging within the receiving space phase conductors that are bathed by the electrically insulating fluid and electrically insulate the phase conductor at least in certain portions. The arrangement of the joining gap over the spanned base area also provides the possibility of keeping the joining gap itself free from sealing elements. The joining gap advantageously extends within the membrane formed by the two sub-elements. A hermetic barrier of the insulating arrangement, which is necessary for maintaining a hermetic closure of an encapsulating housing, is thus not breached by the joining gap. In particular, it may be provided that each of the sub-elements itself can form a fluid-tight barrier over an opening, so that the joining gap extends across the spanned base area through the insulating arrangement. It is thus possible for example to exchange sub-elements one after the other, while the insulating arrangement can at least partially maintain its barrier effect, for example by one of the sub-elements remaining. The joining gap may in this case be variously profiled. It may be provided that the joining gap is bounded between parallel wall portions of the two sub-elements. The joining gap may for example have a planar shape. It may however also be provided that the joining gap has various spatial extents.

It may in this case be advantageously provided that a cavity, in particular a cavity that can be closed off in a fluid-tight manner, is arranged between the first sub-element and the second sub-element.

An arrangement of a cavity that can be closed off in a fluid-tight manner between the sub-elements allows the cavity to be filled for example with a preferred insulating medium, such as for example a compressed gas or an insulating liquid. The filling of the cavity may preferably take place with a medium which is for example also located in a receiving space that is bounded by the insulating system at least in certain portions. This provides a possibility of improving the insulation resistance also in the joining gap/ the cavity located between the sub-elements. It may for example also be provided that the joining gap is for example part of a hermetically closed-off receiving space. Furthermore, the cavity itself may form a closed-off receiving space, or the cavity may be connected by way of one or more channels to one or more further receiving spaces in a communicating manner. The cavity may extend within the joining gap merely in certain portions. For example, the joining gap may extend between substantially parallel wall areas of the sub-elements, only a sub-region being widened to form a cavity. To form a cavity, the wall areas bounding the cavity may be positioned other than parallel. At least one of the wall areas, in particular two of the wall areas, may be formed as curved, in particular concavely curved. In particular, wall areas for the forming of a cavity may be formed as oppositely concave.

For example, in may be advantageously provided that the joining gap can be connected to a neighboring fluid volume by way of a switchable fluid channel.

The use of a fluid channel makes it possible to connect the joining gap, in particular if it has a cavity, to at least one further receiving space. The further receiving space may bound or receive a neighboring fluid volume. A switchability of the fluid channel allows the point in time of a communication of the joining gap with a further receiving space to be variably established, and possibly also interrupted again. Thus, for example, the joining gap may be connected to a fluid volume that is monitored with regard to its quality. As soon as the joining gap is connected to this monitored receiving volume, a monitoring of the state of the joining gap or of the fluid located in the joining gap can also take place. The switchable fluid channel should in this case pass through a fluid-tight barrier of at least one sub-element.

A further advantageous design may provide that the switchable fluid channel has a switching device, in particular a switching device that can be actuated from a radial direction.

The switchable fluid channel may be provided with a sealing barrier by a switching device, so that the fluid channel is blocked and no fluid can flow through the fluid channel. Advantageously, actuation of the switching device of the fluid channel should preferably take place from a radial direction, a radial direction being a direction that runs across the spanned base area of the disk-shaped insulating arrangement. The axial direction of an insulating arrangement is provided by an axis that penetrates a fluid-tight barrier of the insulating arrangement. It may be provided to embed a switching device for the fluid channel for example in one or both sub-elements, so that an actuating element for the switchable fluid channel is arranged on the peripheral lateral surface area of the disk-shaped insulating arrangement. Suitable for example for switching the fluid channel are valves, which can for example be opened and closed by a turning movement.

A further advantageous design may provide that at least one of the sub-elements has a concavely fluted wall area.

A concavely fluted wall area in one of the sub-elements makes it possible to increase the path along the surface of a sub-element and/or to increase the volume of the joining gap. In particular, concavely fluted wall areas may be provided on both sub-elements of the insulating arrangement. In particular, these flutings on the two sub-elements should be arranged such that they are aligned opposite one another. This provides the possibility of introducing greater volumes of fluids into the joining gap. A dielectric stabilization of the joining gap is correspondingly brought about. Production tolerances can also be compensated by such concave fluting, the dielectric strength of the insulating system being retained.

A further advantageous design may provide that at least one of the sub-elements has a predetermined breaking point.

A predetermined breaking point in one of the sub-elements makes it possible for example to allow a pressure relief into the joining gap, in particular if the joining gap has a cavity. Thus, for example, it may be provided that, when there is an excess pressure and one of the sub-elements ruptures under the excess pressure, additional volume is available (in the joining gap/the cavity) for receiving fluid. A volatilizing of the fluid flowing into the joining gap is prevented. By analogy, when an excess pressure occurs in the joining gap or in the cavity, a pressure relief can take place by way of a predetermined breaking point in a neighboring receiving space. The predetermined breaking point may for example be realized by a wall thickness of a sub-element being reduced at least in certain regions. For example, grooves or blind-hole-like recesses may be provided in a disk area of one sub-element of the insulating arrangement, in order to reduce the wall thickness of the sub-element. In the region of the predetermined breaking point, the fluid-tight barrier within one sub-element has a mechanical weakening, so that destruction is preferably initiated in this region.

It may advantageously also be provided that at least one of the sub-elements, in particular both sub-elements, is/are passed through by a phase conductor.

The two sub-elements or the insulating arrangement has/have a disk-shaped structure. A disk is an element that represents a barrier across an axis. A disk is for example a substantially rotationally symmetrical element, an axial direction of the insulating arrangement or sub-element being defined by an axis of rotation. The axial direction passes through a disk area of the sub-element. A disk may represent a fluid-tight barrier. The disk may however also permanently or temporarily have openings through which a fluid can flow. In addition, further rotationally symmetrical forms may also be used for the sub-elements or the disk-shaped insulating arrangement, the axis of rotation in this case defining the axial direction. In particular, the insulating arrangement may have a lateral surface area that runs around in an annular manner and encloses the axial direction.

A phase conductor serves for transmitting electrical current between two points. For this purpose, a voltage that drives an electrical current is applied to phase conductors. The phase conductors pass through the insulating arrangement in the axial direction, i.e. the phase conductor is enclosed by the insulating arrangement, at least in one portion, so that it is ensured by the insulating arrangement that the phase conductor is kept apart from other components that are carrying a different electrical potential. In this case, the phase conductor may be subdivided into various portions, various portions respectively passing through the first or the second sub-element.

Furthermore, it may be advantageously provided that a joining gap of the phase conductor is arranged in the joining gap between the sub-elements.

A phase conductor may be made up of various portions. These portions have to be correspondingly brought into electrical contact with one another in order to ensure a continuous current path in the phase conductor in the axial direction, before and after the insulating system. The connection of portions of the phase conductor in the joining gap has the advantage that this point of discontinuity in the phase conductor is arranged in a separate space. There it can on the one hand be arranged such that it is mechanically protected from external interventions. On the other hand, this region can also be subjected to a particular electrical insulation. Thus, fluid-tight embedding of the phase conductor in a sub-element is possible in a simplified way.

According to the invention, in the case of an assembly method for an insulating system which has a substantially disk-shaped electrically insulating insulating arrangement spanning a base area, it is provided that an interface opening of a first encapsulating housing is at least partially closed by a first sub-element, an interface opening of a second encapsulating housing is at least partially closed by a second sub-element, the interfaces that have interface openings of the two encapsulating housings are connected to one another.

An encapsulating housing is a housing which has an interface opening, for example in the form of a flange opening. This interface opening is to be spanned by an insulating system. If then a first sub-element is used in order to close at least partially an interface opening on a first encapsulating housing and a second sub-element is used in order to close at least partially an interface opening of a second encapsulating housing, the insulating system is suitable for closing two openings on two encapsulating housings, each receiving space into which the respective interface opening of the respective encapsulating housing opens out being closed by a sub-element of the insulating arrangement. There is consequently also the possibility of already filling receiving spaces of the first encapsulating housing and the second encapsulating housing with a fluid that is under excess pressure before the first and second encapsulating housings are joined together. In this way it is possible for example to produce partly assembled encapsulating housings, which are joined together at a later point in time. By filling the receiving spaces with a fluid, contamination of the same is prevented. In particular when excess pressure is applied to a receiving space of an encapsulating housing, an escape of the fluid that is under excess pressure is more likely to be possible than a penetration of foreign bodies into the receiving space of the encapsulating housing. The filled receiving spaces may already be pre-inspected before delivery to an assembly location.

For example, the impermeability of the fluid-tight barrier may be inspected or else a voltage test may be performed. Furthermore, during the pre-assembly, the respective sub-element may be used for example for positioning a portion of the phase conductor.

At a later point in time, the two encapsulating housings may then be connected to one another, so that a completion of the insulating system takes place. This provides a possibility of connecting the two encapsulating housings to one another, while the insulating system may provide a separation of receiving spaces in the first encapsulating housing and in the second encapsulating housing. For example, it may be provided that there is an increase in pressure in the receiving spaces of the encapsulating housings after connecting the two encapsulating housings.

It may advantageously also be provided that the interfaces that have the interface openings of the two encapsulating housings are connected to one another, while interposing the insulating arrangement that has sub-elements.

Interposing the insulating system provides the possibility of applying additional bracing forces to the insulating system. After connecting the interfaces, the insulating system may be in connection with each of the two interfaces. Consequently, an improved bracing of the sub-elements can also be achieved. For example, the insulating system may be placed into an interconnecting flange bond of the encapsulating housing. Various forms of flange may be used as the interconnecting flange bond. Thus, for example, planar annular flanges may be used. Furthermore, flanges with an (annular) shoulder may also be used. The shoulder provides the possibility of protecting the insulating arrangement around the outer lateral surface area.

It may also be advantageously provided that, after connecting the encapsulating housings, a fluid channel is opened, allowing a fluid to flow out of a receiving space of one of the encapsulating housings into a joining gap between the sub-elements.

If a fluid channel is opened after connecting the encapsulating housings, the joining gap between the two sub-elements can be filled with a fluid from one of the receiving spaces that flows through the fluid channel. Consequently, the joining gap between the sub-elements is connected to one of the receiving spaces and can be monitored by way of the latter. Furthermore, this provides the possibility that the insulating arrangement has the effect that both the receiving space of the first encapsulating housing and the receiving space of the second encapsulating housing are in connection with one another by way of the gap lying in between. Consequently, the dielectric stability of the insulating arrangement in the interconnecting bond of the two encapsulating housings is stabilized.

Furthermore, the filling of the joining gap after connecting the encapsulating housings allows the possibility of using a receiving space for indirectly filling the joining gap in an easy way. This avoids using separate filling devices etc. for subsequently filling the joining gap.

A further advantageous design may provide that a phase conductor has a first portion and a second portion, the first portion passing through the first sub-element and the second portion passing through the second sub-element and the portions being connected to one another in an electrically conducting manner during/after a joining together of the encapsulating housings.

A phase conductor serves for transmitting electrical energy. Separating a phase conductor into a first portion and a second portion provides the possibility of assigning one of the sub-elements to each of the two portions and embedding them in the respective sub-element.

It is correspondingly possible already during assembly of one sub-element for a positioning of the respectively assigned portion of a phase conductor also to be provided on one of the two encapsulating housings. By bringing the portions into electrical contact during or after the joining together of the encapsulating housings, a continuous current path through the insulating arrangement is established. Contact between the portions can preferably be made by pressing the portions onto one another or inserting them into one another. Thus, a permanently elastic connection, which possibly can also compensate for dimensional changes occurring as a result of thermal effects, can be established between the two portions.

It may in this case be provided that for example an individual phase conductor is respectively arranged centrally in the disk-shaped insulating arrangement. It may however also be provided that a number of phase conductors are arranged in one and the same insulating arrangement, these passing through the insulating arrangement independently of one another and, by way of the insulating arrangement, being both positioned in an electrically insulated manner with respect to one another and also supported in an electrically insulated manner with respect to a supporting unit such as an encapsulating housing.

BRIEF DESCRIPTION OF THE SEVERAL VIEWS OF THE DRAWING

An exemplary embodiment of the invention is schematically shown hereafter in a drawing and is described in more detail below. In the drawing:

FIG. 1 shows an insulating system in the unassembled state,

FIG. 2 shows an intermediate step during assembly of the insulating system,

FIG. 5 shows a first outside view, FIG. 6 shows a second outside view in an alternative design and FIG. 7 shows a use of the insulating system in an alternative flange connection.

DESCRIPTION OF THE INVENTION

Figure 3:
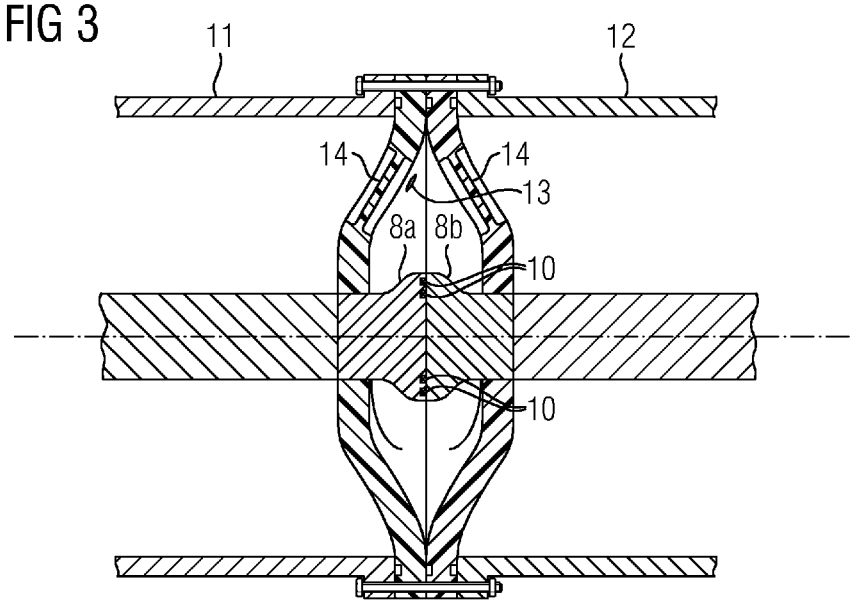
FIG. 3 shows the insulating system in the assembled state.

FIG. 1 shows an insulating system in the unassembled state. The insulating system has a disk-shaped insulating arrangement 1. The disk-shaped insulating arrangement is in this case formed as substantially rotationally symmetrical, the axis of rotation defining a longitudinal axis 2. The longitudinal axis 2 penetrates, in particular substantially perpendicularly, a base area, in particular a planar base area, which is spanned by the insulating arrangement 1. The disk-shaped insulating arrangement 1 has a first sub-element 3 and a second sub-element 4. The two sub-elements 3, 4 are electrically insulating solid insulators. The two sub-elements 3, 4 are formed approximately identically, while the two sub-elements 3, 4 lie coaxially in relation to one another and in relation to the longitudinal axis 2. The sub-elements 3, 4 have in this case a substantially circular outer contour, so that an outer cylindrical lateral surface area is formed. An additional frame element that encloses the sub-elements 3, 4 around the outer lateral surface area is not used in the present case. Such a frame element may be of advantage to protect the two sub-elements 3, 4 from mechanical loads. The function of the frame element may for example be integrated in a flange or in a housing (cf. FIG. 7). Each of the two sub-elements 3, 4 respectively has on its outer periphery annular flange areas 5*a*, 5*b*, 5*c*, 5*d*. These flange areas 5*a*, 5*b*, 5*c*, 5*d* could for example also be integrated in a frame element respectively surrounding the two sub-elements 3, 4, so that flange forces are kept away from the two sub-elements 3, 4. Such a frame element may for example be a metal frame. The flange areas 5*a*, 5*b*, 5*c*, 5*d* are formed in an annular manner and run around the two sub-elements 3, 4 coaxially in relation to the longitudinal axis 2. In the flange areas 5*a*, 5*b*, 5*c*, 5*d* there are through-openings 6, by means of which a bolting of the two sub-elements 3, 4 with respect to one another and with respect to further flange areas is made possible. Also provided in the flange areas 5*a*, 5*c*, 5*d* are annular grooves 7, into which for example sealing elements such as O-rings can be placed, so that a fluid-tight interconnecting bond between the flange areas 5*a*, 5*c*, 5*d* and a respectively diametrically opposed flange area is made possible. The two sub-elements 3, 4 are centrally passed through by a phase conductor, which is subdivided into a first portion 8*a* and a second portion 8*b*. The two portions 8*a*, 8*b* of the phase conductor pass through the first sub-element 3 and the second sub-element 4 in a fluid-tight manner. By way of example, a feed-through with a single centrally arranged phase conductor is shown here. It may however also be provided that a number of phase conductors are embedded in each of the two sub-elements 3, 4 of the disk-shaped insulating arrangement. Each of the two sub-elements 3, 4 is in this case provided with a convexity, so that the flange planes formed by the respective flange areas 5*a*, 5*b*, 5*c*, 5*d* are perforated by the walls of the first sub-element 3 and second sub-element 4, respectively. This creates in each case a bulging first sub-element 3 and second sub-element 4, the mutually facing sides of the first sub-element 3 and second sub-element 4 having wall areas that are oppositely concavely fluted, so that a joining gap 9 that is formed between the two sub-elements 3, 4 after a bracing of the same has a widening cavity.

The two portions 8*a*, 8*b* of the phase conductor respectively pass through concavely lying wall areas and protrude into the plane of a flange area 5*b*, 5*c*. Arranged in at least one of the two portions 8*a*, 8*b* of the phase conductor are recesses 10 for receiving resilient contact elements. One or more recesses 10 may be respectively arranged only in one of the two portions 8*a*, 8*b* of the phase conductor. It may however also be provided that one or more recesses 10 are arranged at least in one of the two portions 8*a*, 8*b* of the phase conductor. On the concavely fluted side, the portions 8*a*, 8*b* respectively finish flush with a plane of a flange area 5*b*, 5*c* in the respective disk area.

The disk-shaped insulating arrangement 1 of the insulating system is intended to be inserted into a flange connection between a first encapsulating housing 11 and a second encapsulating housing 12. The two encapsulating housings 11, 12 are represented in a schematized manner in FIG. 1. Each of the two encapsulating housings 11, 12 has a flange area, which can be brought into abutting contact with flange areas 5*a*, 5*d* of the same dimensions of the two sub-elements 3, 4 of the insulating arrangement 1. The two encapsulating housings 11, 12 are in this case preferably formed as metal encapsulating housings, which represent a fluid-type barrier, in order to receive in their respective receiving space enclosed inside an electrically insulating fluid in a hermetically encapsulated manner. In this case, the disk-shaped insulating arrangement serves in each case for closing an interface opening respectively of an interface in the first encapsulating housing 11 and the second encapsulating housing 12.

FIG. 2 shows in intermediate assembled state, in which the first sub-element 3 is connected in an angularly rigid manner to the first encapsulating housing 11 and the second sub-element 4 is connected in an angularly rigid manner to the second encapsulating housing 12. It can be seen here that the through-openings 6 are still kept free of fastening means. For the respective positioning and fixing of the sub-elements 3, 4 on the respective flange of the respective encapsulating housing 11, 12, further recesses that allow individual fastening of the respective sub-element 3, 4 to the respective encapsulating housing 11, 12 are arranged offset in the periphery of the flange areas 5*a*, 5*b*, 5*c*, 5*d*. Thus there is the possibility of closing the interface openings of the encapsulating housings 11, 12 and locally fixing the sub-elements 3, 4. The sealing elements placed into the annular grooves 7 can be used to achieve a corresponding sealing effect. There is then the possibility of pre-filling the receiving spaces for the electrically insulating fluid inside the first encapsulating housing 11 and the second encapsulating housing 12 with a fluid. Reference should also be made here to a channel 13 that has been introduced by way of example in the first sub-element 3. The channel 13 represents a permanent penetration of the first sub-element 3, which in this case does not offer a filling of the receiving space of the first encapsulating housing 11 because, without closure of the channel 13, a volatilizing of fluid located in the receiving space of the first encapsulating housing 11 can take place by way of the channel 13. The position of the channel 13 is only intended here to give a further design possibility by way of example, while it is also possible, according to requirements, for further sub-elements or further configurations to be equipped with such a channel 13 allowing a permanent through-flow.

Apart from (at least partial) closing of the receiving spaces 11, 13 by way of the first sub-element 3 and the second sub-element 4, respectively, such assembly has the advantage that the phase conductor is already positioned with its portions 8*a*, 8*b* with respect to the respective encapsulating housing 11, 12. Consequently, auxiliary supporting of the phase conductor is not necessary. Furthermore, the phase conductor inside the encapsulating housings 11, 12 is to the greatest extent protected for example from mechanical influences.

In a further assembly step, a bolting of the flanges surrounding the interface openings of the first encapsulating housing 11 and the second encapsulating housing 12, while interposing the insulating arrangement 1 (which has the first sub-element 3 and the second sub-element 4), is provided. The through-openings 6, which in FIG. 2 are still kept free of any connecting element, are now passed through by bolts (FIG. 3), so that, in addition to the flange-mounting that has already taken place of each individual sub-element 3, 4 with in each case an encapsulating housing 11, 12, an overall flange-mounting of the encapsulating housings 11, 12, while interposing the sub-elements 3, 4 of the disk-shaped insulating arrangement 1, is ensured. Now the joining gap 9 that is created is also sealed off by way of a sealing element placed in the corresponding annular groove 7. The joining gap 9 extends centrally on both sides in a convexly curved manner inside the insulating arrangement 1. A lenticular cavity is in this case connected by way of the channel 13 to the receiving space of the first encapsulating housing 11. The second encapsulating housing 12 or its receiving space is separated from the receiving space of the first encapsulating housing 11 and from the cavity inside the insulating arrangement 1. The two portions 8*a*, 8*b* of the phase conductor are pressed against one another on account of the pressing of the encapsulating housings 11, 12 and the sub-elements 3, 4, while corresponding contact elements are interposed in the region of the recesses 10. These elements may for example be contact springs or contact fingers, so that between the two portions 8*a*, 8*b* of the phase conductor there is a transition capable of carrying current. Thermal expansions can also be compensated by way of these contact elements. Furthermore, a predetermined breaking point 14 is arranged in each of the two sub-elements 3, 4. The predetermined breaking points 14 take the form of a zone of reduced wall thickness, so that, when there is an excessive difference in pressure between the receiving spaces separated by way of the insulating arrangement 1 or in relation to the cavity inside the insulating arrangement 1, relief occurs by rupturing of the barrier of one sub-element 3, 4. For example, when there is an excess pressure in the receiving space of the second encapsulating housing 12, a relief of pressure can take place into the cavity of the disk-shaped insulating arrangement and continuing further by way of the channel 13 into the receiving space of the first encapsulating housing 11. By analogy, also when an excess pressure occurs in the cavity, a relief of pressure may take place into one of the receiving spaces through a rupturing of a predetermined breaking point 14.

Figure 4:
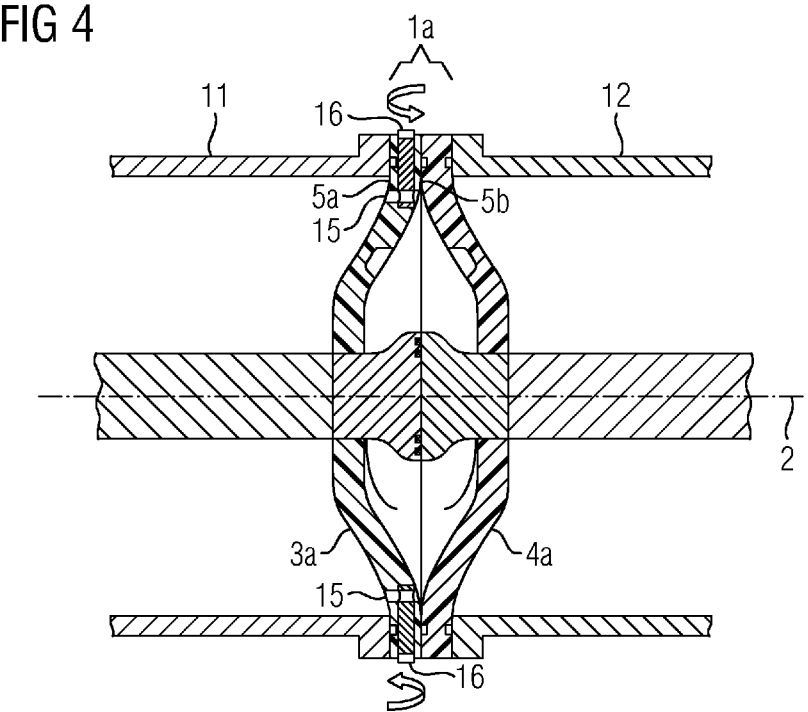
FIG. 4 shows a section through a configurational variant of an insulating system in the assembled state.

As an alternative to the use of a channel 13 in one of the sub-elements 3, 4 (or both sub-elements 3, 4), in FIG. 4 the use of a switchable fluid channel 15 is provided by way of a departure. In one of the sub-elements 3a of the alternatively configured disk-shaped insulating arrangement 1a that is shown in FIG. 4, a through-opening extending axially in relation to the longitudinal axis 2 is arranged. This through-opening is provided in the region of flange areas 5a, 5b of the corresponding sub-element 3a, 4a. In this case, two switchable fluid channels 15 are represented in section on the first sub-element 3a, so that the cross section available for the overflowing of fluid from a receiving space of the first encapsulating housing 11 is increased. Respectively provided for switching the switchable fluid channels 15 is a rotatable shaft 16, which passes through the peripheral region with the flange areas 5a, 5b, 5c, 5d of the first sub-element 3a from a radial direction with respect to the longitudinal axis 2. The rotatable shafts 16 respectively protrude into a switchable fluid channel 15 and are provided with a through-bore lying radially in relation to the axis of rotation of the rotatable shafts 16 in the portion in which the rotatable shafts pass the respective switchable fluid channel 15. This through-bore has approximately the cross section of the fluid channel 15 to be switched. By turning 90°, it is possible to open the respective switchable fluid channel 15 (see FIG. 4). Further turning by 90° has the effect that the respective switchable fluid channel 15 is closed by the lateral surface areas of the respective shaft 16.

In FIG. 4, the already opened switchable fluid channels 15 can be seen. The use of a switchable fluid channel 15 has the advantage that a fluid-tight closure of the respective interface opening is respectively made possible during the connection of the two sub-elements 3a, 4a to a flange of the respective interface opening of the first encapsulating housing 11 and the second encapsulating housing 12, respectively. The receiving spaces both of the first encapsulating housing 11 and the second encapsulating housing 12 can be correspondingly pre-filled with a fluid. Once flange-mounting of the first encapsulating housing 11 and the second encapsulating housing 12 has taken place, an overflowing of a fluid from the receiving space of the first encapsulating housing 11 into the cavity/the joining gap 9 between the sub-elements 3a, 4a of the disk-shaped insulating arrangement 1a can take place by an opening of the valves formed by the rotatable shafts 16 in the switchable fluid channels 15. The cavity is correspondingly also filled with a fluid, possibly under excess pressure.

In FIG. 4, the sectional plane is chosen such that recesses for receiving bolts for the flange-mounting of the individual sub-elements are not quite included in the section, in order to be able to depict a section through the rotatable shafts 16.

FIG. 5 shows by way of example a variant for forming a flange-mounting of the first encapsulating housing 11 and the second encapsulating housing 12. It can be seen here that the flange areas 5a, 5b, 5c, 5d of the sub-elements 3a, 4a are of the same dimensions as the flange areas of the flanges bounding the interface openings of the first encapsulating housing 11 and the second encapsulating housing 12, respectively. Consequently, a congruent flange connection that is in line in the axial direction 2 is formed. The circular path in which the individual bracing elements are arranged is the same here in all the flange areas. This is indicated by the dash-dotted lines 17. Only in the peripheral direction is there an offset of the individual bracing elements, so that each of the sub-elements 3, 3a, 4, 4a can be individually flange-mounted in the respectively associated encapsulating housing 11, 12 and, in addition, the encapsulating housings 11, 12 can be flange-mounted, while interposing the disk-shaped insulating arrangement 1, 1a.

The access from radial directions provided on the lateral surface area to the switching devices, which have been configured here as a rotatable shaft 16, can also be seen in FIG. 5. At the same time, FIG. 5 shows that the shafts 16 arranged in the sub-elements 3a, 4a are offset in relation to one another in the peripheral direction. Correspondingly, on account of the position of the sectional plane, in FIG. 4 only positions of the rotatable shafts 16 of the first sub-element 3a can be seen. Such a construction has the advantage that the receiving space of the first encapsulating housing 11 or the receiving space of the second encapsulating housing 12 can be connected according to requirements to the cavity/the joining gap inside the disk-shaped insulating arrangement 1a. According to requirements, a communication of the receiving spaces of the first encapsulating housing 11 and the second encapsulating housing 12 can also be enabled by an opening of the switchable fluid channels both in the first sub-element 3a and in the second sub-element 4a.

FIG. 6 shows an alternative design possibility of a flange connection, the insulating arrangement 1b concerned there having an increased cross section with respect to the flanges surrounding the interface opening. This provides the possibility on the one hand of connecting each of the sub-elements 3b, 4b independently to a flange of the first encapsulating housing 11 or the second encapsulating housing 12 and flange-mounting the two sub-elements 3b, 4b to one another by way of the increased pitch circle, and thus fixing the first encapsulating housing 11 and the second encapsulating housing 12 in an angularly rigid manner in relation to one another. In this case, a circular path of fastening elements is located in the flange areas 5a, 5b, 5c, 5d of the first sub-element 3b and the second sub-element 4b, in order to respectively connect them individually to the first encapsulating housing 11 or the second encapsulating housing 12. Furthermore, in the flange areas 5a, 5b, 5c, 5d there is a further circular path, which has an increased diameter, by means of which the joining together of the first sub-element 3b and the second sub-element 4b of the disk-shaped insulating arrangement 1b is made possible, so that the first encapsulating housing 11 and the second encapsulating housing 12 are also fixed in an angularly rigid manner in relation to one another.

Figure 7:
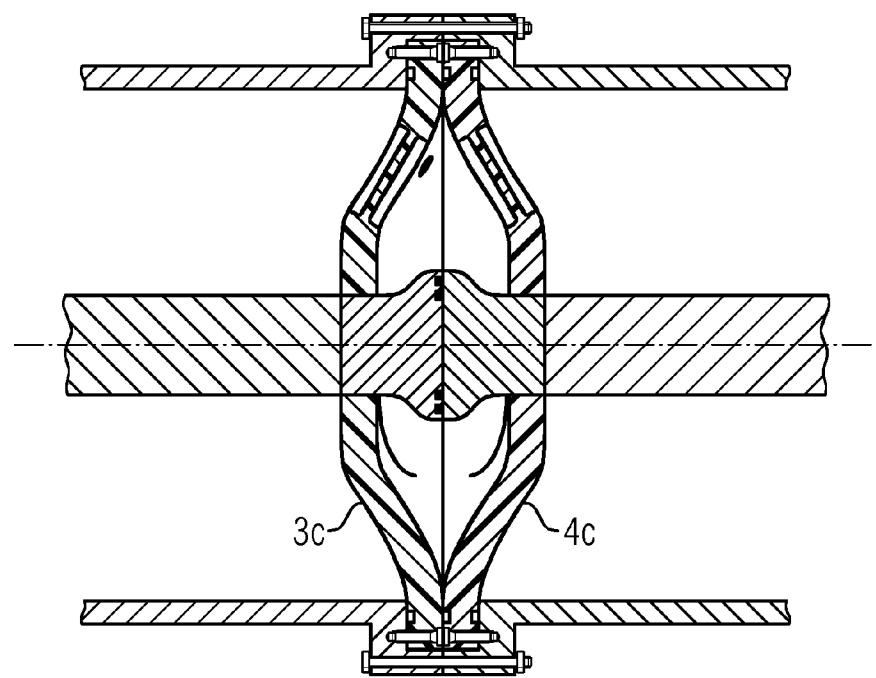

FIG. 7 shows a continuation of the device known from FIG. 3. As a departure, an alternative flange connection is used. The flanges have in each case an annular shoulder running around the outer lateral surface area. Thus, sub-elements 3c, 4c are placed flush in one of the flanges. Lateral surface areas of the sub-elements 3c, 4c are enclosed and covered over by the annular shoulder. For the fastening of the sub-elements 3c, 4c, the screwing in the axial direction to the respective flange is provided. Consequently, the sub-elements are mechanically protected in an improved way.

The invention claimed is:

1. An insulating system, comprising:
   an electrically insulating, substantially disk-shaped insulating configuration spanning a base area;
   said insulating configuration having at least one first sub-element and at least one second sub-element defining a joining gap therebetween spanning said base area, at least one of said sub-elements having a fluid-tight barrier; and
   a switchable fluid channel passing through said at least one of said sub-elements forming said fluid-tight barrier for connecting said joining gap to a neighboring fluid volume.

2. The insulating system according to claim 1, wherein said at least one first sub-element and said at least one second sub-element define a cavity therebetween.

3. The insulating system according to claim 2, wherein said cavity can be closed off in a fluid-tight manner.

4. The insulating system according to claim 1, wherein said switchable fluid channel has a switching device.

5. The insulating system according to claim 4, wherein said switching device can be actuated from a radial direction.

6. The insulating system according to claim 1, wherein at least one of said at least one first sub-element or said at least one second sub-element has a concavely fluted wall area.

7. The insulating system according to claim 1, wherein at least one of said at least one first sub-element or said at least one second sub-element has a predetermined breaking point.

8. The insulating system according to claim 1, which further comprises a phase conductor passing through at least one of said at least one first sub-element or said at least one second sub-element.

9. The insulating system according to claim 8, wherein said phase conductor has a joining gap disposed between said at least one first sub-element and said at least one second sub-element.

10. An assembly method for an insulating system having a substantially disk-shaped, electrically insulating, insulating configuration spanning a base area, the assembly method comprising the following steps:
    at least partially closing an interface opening of a first encapsulating housing by using a first sub-element;
    at least partially closing an interface opening of a second encapsulating housing by using a second sub-element;
    providing at least one of the sub-elements with a fluid-tight barrier and a switchable fluid channel passing through the at least one of the sub-elements forming the fluid-tight barrier for connecting a joining gap disposed between the sub-elements to a neighboring fluid volume; and
    interconnecting interfaces of the first and second encapsulating housings having the interface openings.

11. The assembly method according to claim 10, which further comprises carrying out the step of interconnecting the interfaces of the first and second encapsulating housings having the interface openings, while interposing the insulating configuration having the first and second sub-elements.

12. The assembly method according to claim 10, which further comprises after interconnecting the encapsulating housings, opening a fluid channel to allow a fluid to flow out of a receiving space of one of the encapsulating housings into a joining gap between the sub-elements.

13. The assembly method according to claim 10, which further comprises:
    providing a phase conductor having a first portion passing through the first sub-element and a second portion passing through the second sub-element; and
    interconnecting the first and second portions in an electrically conducting manner during or after joining the first and second encapsulating housings together.

* * * * *